Figure 1:
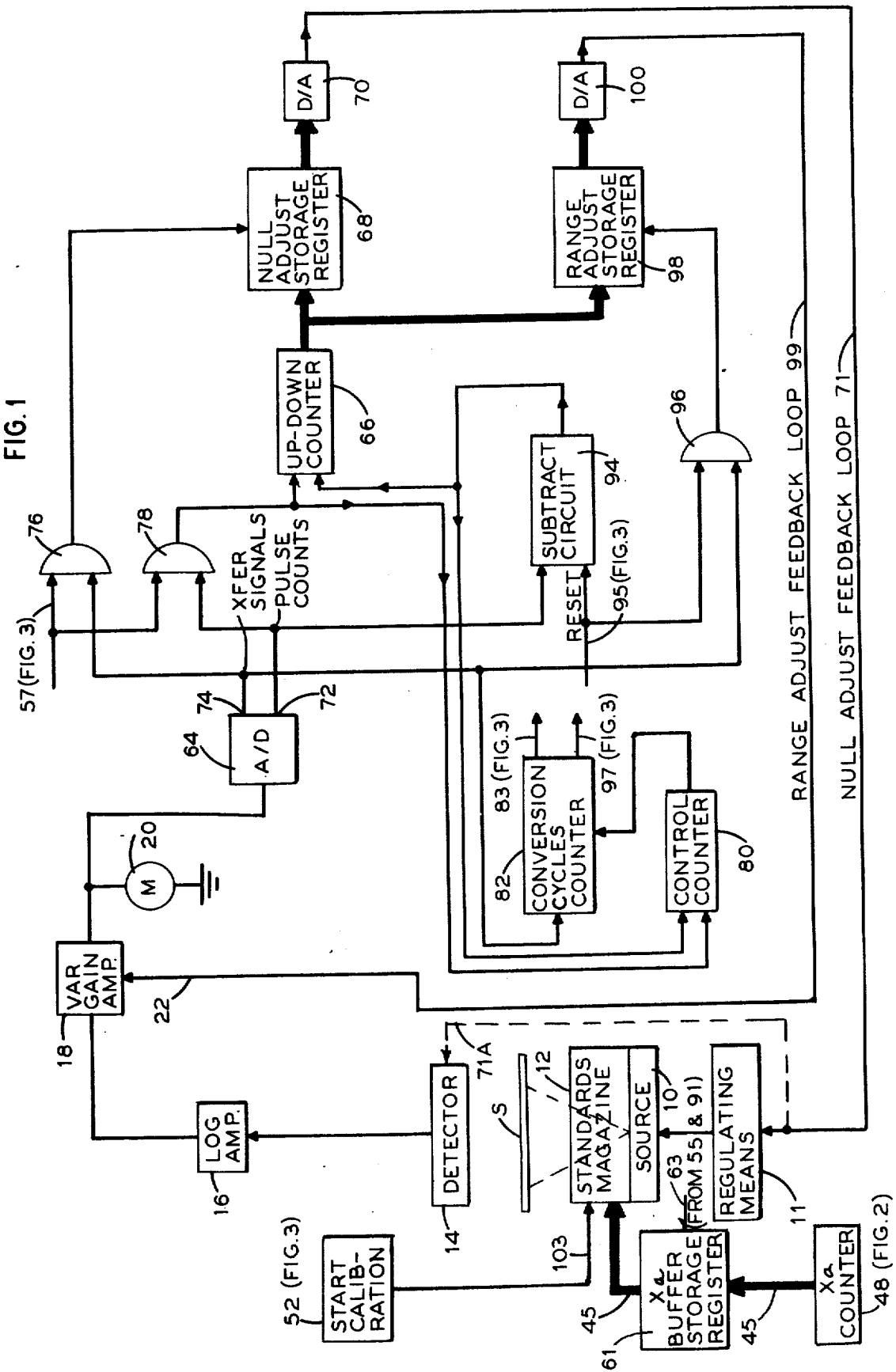

United States Patent [19]

Faraguet

[11] 4,009,376
[45] Feb. 22, 1977

[54] METHOD AND APPARATUS FOR MEASURING MATERIAL THICKNESS
[75] Inventor: Claude Faraguet, Summit, Pa.
[73] Assignee: Sangamo Weston, Inc., Archbald, Pa.
[22] Filed: Feb. 5, 1975
[21] Appl. No.: 547,160

Related U.S. Application Data
[63] Continuation of Ser. No. 226,457, Feb. 15, 1972, abandoned.
[52] U.S. Cl. ............................ 235/151.3; 250/252; 250/359
[51] Int. Cl.² ................ G01N 23/16; G01T 1/16
[58] Field of Search ........... 235/151.3, 151.32, 92; 73/23.1; 250/354, 358, 359, 252, 360

[56] References Cited
UNITED STATES PATENTS

| 2,936,374 | 5/1960 | Zimmer | 250/354 |
| 3,180,985 | 4/1965 | Leighton | 250/252 |
| 3,294,958 | 11/1966 | Duvall | 235/92 |
| 3,316,751 | 5/1967 | Burk | 73/23.1 |
| 3,524,063 | 8/1970 | Mangan | 250/359 |
| 3,611,408 | 11/1971 | Shoemaker et al. | 250/359 |
| 3,619,613 | 11/1971 | Chope | 250/359 |
| 3,706,888 | 12/1972 | Wunsch | 250/358 |
| 3,715,592 | 2/1973 | Busch | 250/359 |
| 3,832,550 | 8/1974 | Bartlett et al. | 250/358 |

Primary Examiner—Felix D. Gruber
Attorney, Agent, or Firm—William R. Sherman; Jean-Yves Monod

[57] ABSTRACT

A non-contacting gauge for measuring thickness deviations of strip material including alloyed metal strip. The gauge includes a radiation source for emitting a beam of material-penetrating radiation, a detector circuit for sensing the radiation, a meter for indicating deviations in strip thickness from a nominal thickness and a standards magazine for selectively inserting elements of different standard thicknesses into the beam. The composite thickness of standards is made equal to the nominal thickness for all values within a given measurement range. Compensation for alloy constituents in the strip and an accurate correlation between meter readings and a range of thickness variations are automatically provided. With one or more standards in the beam, the meter is nulled to the nominal thickness of the strip by signals developed and fed back to adjust, for example, the source radiation level. A second calibration is then effected by adding other standards corresponding to the anticipated range of thickness variations and repeatedly adjusting the detector circuit gain to yield an accurate correlation between a meter reading and a value of strip thickness in that range. These gain adjustments are performed until a predetermined sensitivity to thickness variations is obtained.

66 Claims, 3 Drawing Figures

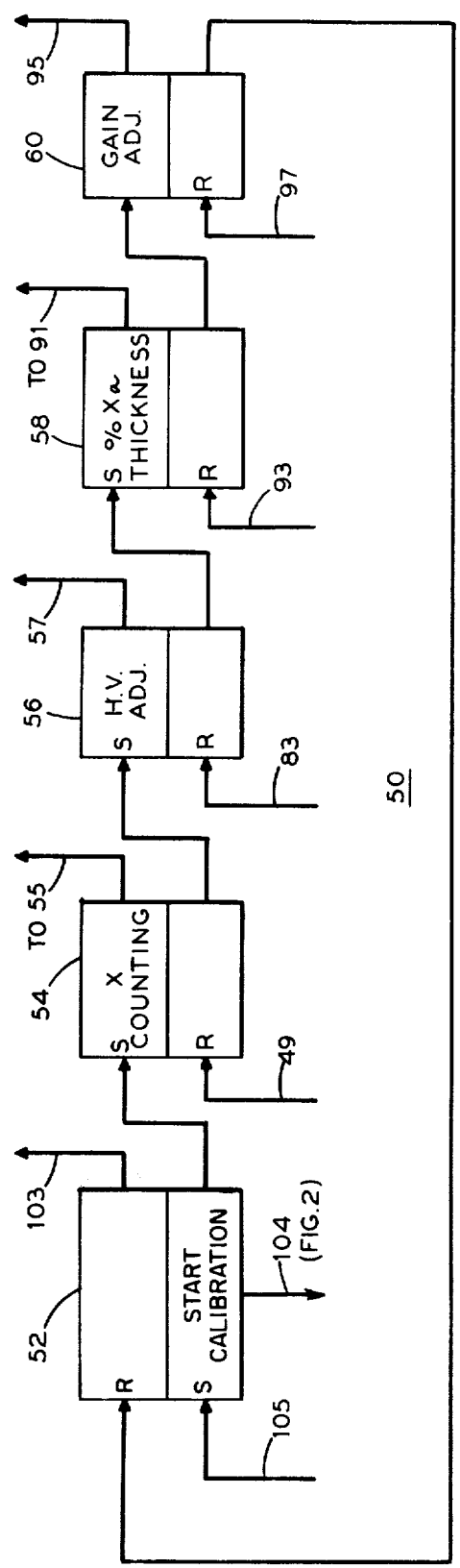

METHOD AND APPARATUS FOR MEASURING MATERIAL THICKNESS

This is a continuation of application Ser. No. 226,457, filed Feb. 15, 1972 and now abandoned.

This invention relates generally to thickness measuring systems of the non-contacting type, and more particularly, to gauges which provide analog indications of deviations in thickness between the material under measurement and a thickness standard.

Thickness gauges of the non-contacting type typically utilize a suitable source of radiation and a radiation detector aligned with the source to receive radiation emanating from material located therebetween. The material typically takes the form of a moving strip or sheet which is intercepted by a beam of radiation from the source as the strip advances therepast. The intensity of the radiation leaving the strip is received and amplified by the detector and constitutes the basis for comparing the thickness of the gauged strip against some nominal thickness value. To establish the nominal thickness value, such gauges typically employ a standards magazine which functions on command to displace one or more elements of known, precise thickness into the beam. The gauge is normally calibrated to null an analog meter coupled to the output of the detector with a particular nominal thickness of standard in the beam. Deviations of a strip thickness from this nominal value appear as deviations of a meter indicator.

Gauges of this type are intended to be used for a relatively wide range of thickness measurements. In order to reduce the number of standards which would otherwise be required for such measurement range, prior art gauges are typically designed around a so-called "complementary" standards system. Briefly, this system involves sub-dividing the full measurement range into a plurality of subranges, typically four, and utilizing four discs of predetermined, precise thickness appropriate for each of the subranges. The calibration of each subrange is normally referenced to a single standard of maximum thickness (the so-called "base standard") for each particular subrange. With the base standard removed from the beam, it is possible to measure lesser thicknesses of material in that subrange. This is accomplished in gauges utilizing the complementary standards system by suitably energizing the standards magazine to insert into the beam coincidentally with the strip certain ones of the standards having lesser thicknesses than the base standard. These standards are selected to complement the thickness of the strip so that the total material thickness in the beams as constituted by the strip plus that of the standards equals the thickness against which the analog meter was initially nulled, that is, the thickness of the base standard of that particular thickness range. Deviations in strip thickness appear on the analog meter as deviations from a null or midpoint on the meter scale.

As known in the art, the quality of a gauge of the type presently under consideration is describable in terms of its signal-to-noise ratio. The noise factor in this ratio has, by definition, a value of zero with only the base standard in the beam, since it will be recalled, it is this standard on which the gauge is nulled. Thus, as the relative differences in thickness between the strip under measurement and the base standard increases, the magnitude of the noise factor in the signal-to-noise ratio increases, causing corresponding degradation of gauge quality.

Manifestly, it would be advantageous to have a constant, minimum noise factor over the full desired range of thickness measurements without requiring a significantly greater number of standards than that required by gauges which have the same overall range but are designed around the complementary standards system.

Additionally, in accordance with known prior art thickness measuring techniques, the calibration of non-contacting radiation thickness measuring gauges is largely performed manually. Manual methods are not only subject to operator error, but are also time consuming and disadvantageous in operating situations where the gauge must be calibrated quickly to different nominal thicknesses of differently alloyed metals as may be encountered in rolling mills. In general, therefore, it is desirable to be able to completely re-calibrate the gauge quickly and as often as desired with minimal operator involvement.

It is an object of this invention to provide new and improved methods and apparatus for measuring material thickness.

Another object of the invention is to provide a non-contacting type thickness gauge which has a high and relatively constant signal-to-noise ratio throughout a range of measured values.

It is yet another object of the present invention to provide apparatus and methods by which a non-contacting radiation thickness gauge can be automatically and fully calibrated to different nominal thicknesses of strip or sheet material, including metal material containing various alloy constituents.

According to one aspect of this invention, a single range gauge is described which provides information by way of analog meter indicator deviations with respect to thickness deviations of a gauged material such as metal sheet or strip material and automatically calibrates to different thicknesses of the same or differently-alloyed metals.

Complete calibration of the gauge to a desired thickness value is achieved through operation of two servo loops. The loops are operated successively to null an analog meter to the desired nominal or apparent thickness value and to calibrate the meter on a programmed deviation from null, whereby thickness deviations from null are referenced to an appropriate meter scale and scale value. Specifically, the first loop operates to adjust either the high voltage of the radiation source or the amplification of the radiation detector to obtain a meter null with selected standards in the beam emanating from the source, the selected standards having a total thickness in the beam equal to the nominal, or if necessary, the apparent thickness, of the material to be measured. By "apparent thickness" is meant the nominal thickness corrected by a factor which compensates for effects that alloys in the metal have on its coefficient of radiation absorption and hence on the intensity of the beam as detected by emanating from the material. The second loop operates to vary the gain of a variable gain amplifier coupling the detector output to the analog meter input until a predetermind deflection of the analog meter which reasonably encompasses the full range of anticipated material thickness variations is obtained. The meter is also automatically calibrated for each anticipated range of thickness deviations from nominal to a predetermined degree of sensitivity.

Figure 2:
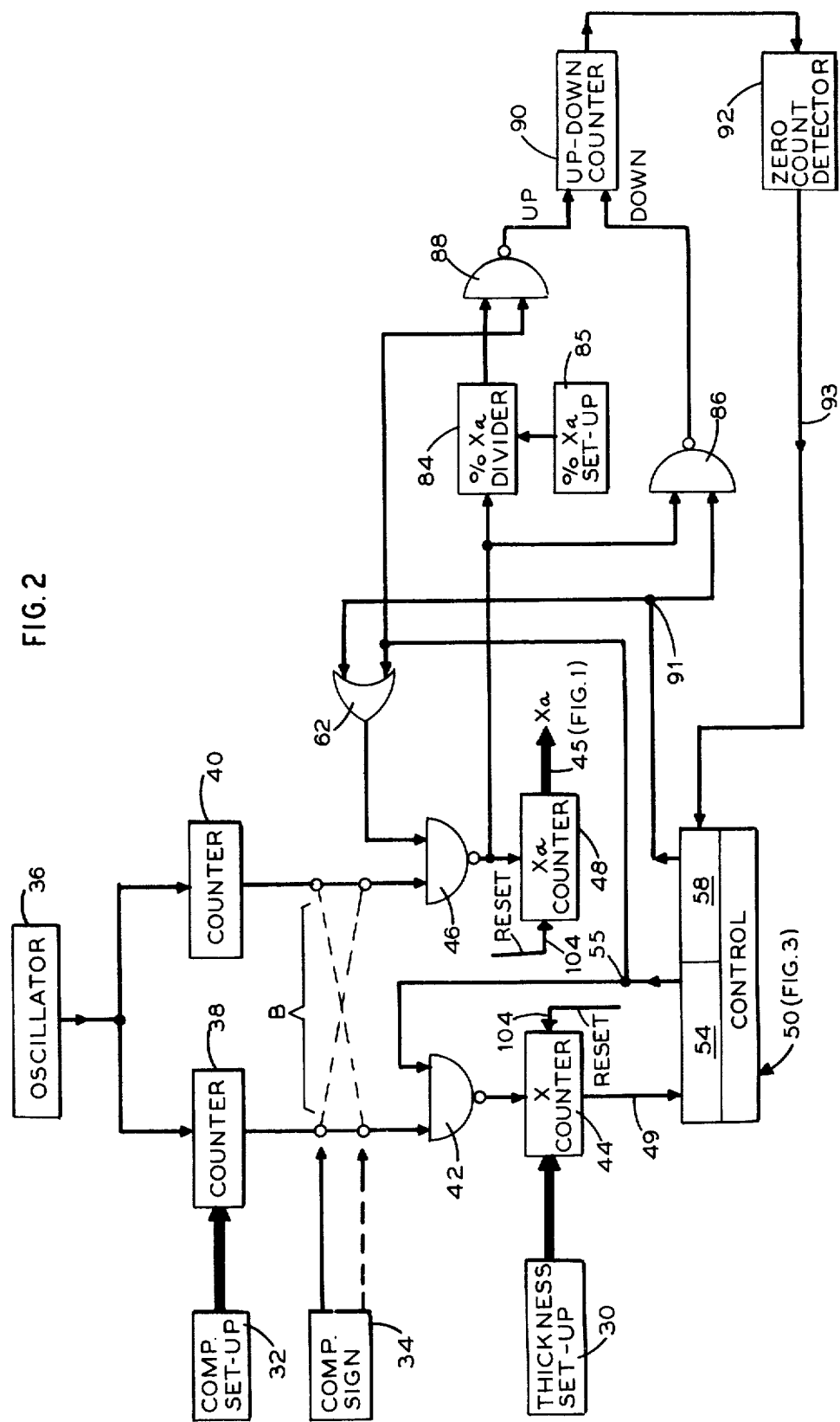

The novel features that are considered to be characteristic of the invention are set forth with particularity in the appended claims. The invention itself, however, both as to its organization and method of operation as well as additional objects and advantages thereof will best be understood from the following description when read in connection with the accompanying drawings wherein:

FIGS. 1 and 2 are schematic circuit diagrams, in block form, of one embodiment of a gauge constructed in accordance with the present invention; and FIG. 3 is a schematic diagram, in block form, of a control for the circuits of FIGS. 1 and 2.

Referring to FIG. 1 of the drawings, a non-contacting gauge in accordance with the present invention includes a suitable source of radiation 10, for example, a D.C. energized X-ray generator, or a radioactive isotope.

A standards magazine 12 located above the source 10 incorporates a plurality of metal standards of precise, known thicknesses and alloy compositions. Only preselected ones of the standards are inserted into the path of the source radiation by energization of corresponding standards-driving solenoids for the purpose of calibrating the gauge. During a measurement mode, as distinguished from the gauge calibration mode, a sheet or strip of material S whose thickness deviation from the preselected standards is to be measured will be positioned in the path of the radiation in lieu of the standards. The standards typically comprise a plurality of discs, each disc being mounted on a separate arm, the arms being movable by a corresponding number of solenoids so as to be selectively positioned in the radiation beam. Various reference standard thicknesses may be selectively established in the radiation beam by inserting one or more standard discs therein. In a broader sense, the word standard may be used not only to designate a particular disc in the standards magazine but also any reference substance or material sample of known X-ray absorbing effect, (typically of known thickness and composition) which is employed to perform a measurement for calibrating the gauge. Such standard may consist of a selected combination of discs of the standards magazine.

The discs each consist of the same known metal composition but are coded to have different values. By providing the standards with thickness values based upon the binary-coded decimal (BCD) system, it will be understood that, with 16 discs, any four decimal digit combination of thicknesses, e.g., 0.0001 inches to 0.9999 inches, can be selectively inserted into the beam. Standards magazine which are responsive to four-digit BCD input signals representative of the desired thickness value are available in the art.

The effect of radiation absorption by the selected discs in the standards magazine or on a strip of material S is detected and amplified by a conventional detector 14 positioned opposite the standards magazine 12 and strip S in alignment with the beam. The detector may be of the conventional scintillation photomultiplier type. The electrical voltage output of the photomultiplier will be a function of the coefficient of absorption of the material inserted in the beam and typically, the magnitude of this output is inversely related to the thickness of the inserted material, be it the calibrating standards or strip of unknown thickness. It will be understood that other types of detection devices may be substituted for the scintillation type.

The output of the detector 14 is applied to the input of a logarithmic amplifier 16 which serves to provide a voltage output which is substantially a linear function of the thickness of the material in the radiation path. From the amplifier 16, the signal is coupled via a variable gain amplifier 18 to an appropriate display, generally an analog meter 20. A feedback control signal, derived as will hereinafter be described, is coupled via lead 22 to an input of the amplifier 18 so as to automatically adjust the gain of the amplifier 18, and thus the rate of variation of the signal amplified thereby, to provde a predetermined deflection of the meter 20 so that the meter 20 scale is properly correlated to thickness in the desired range of measurement.

The digital logic circuitry, FIG. 2, used to provide the BCD thickness signal input to the standards magazine for calibration of the gauge of the present invention will now be described.

Nominal thickness selections for a strip measured are made by a thickness set-up mechanism 30 which, for a four digit BCD standards magazine may comprise four manually operable decimal-numbered thumbwheels appropriately calibrated in increments of 0.0001 of an inch and logic circuitry for providing parallel bit BCD output signals representative of any particular setting of the thumbwheels.

As has been noted, the radiation absorption coefficient of a material is a function of its composition. Thus, if the composition differs from that of the standards, calibration of the gauge based on a nominal thickness of the standards will not be accurate for measurement of a different material composition. The amount of compensation required for a given thickness of material under measurement is based upon the type of radiation source used and the nominal thickness and composition of the standards. When the material is composed of metal received from a rolling mill, the mill typically makes available information on the "apparent" thickness of the strip metal. Differences between nominal and apparent thicknesses are attributable to the effect on the absorption coefficient value that alloys in the metal have on a beam of a particular type and intensity. This data may be expressed in terms of the necessary percent compensation which should be given to the thickness of the standards whereby a compensated nominal thickness of standards equals the nominal thickness of the metal strip.

The compensation reqired, which may be expressed in digits to the nearest one-tenth of one percent, is entered in a compensation set-up mechanism 32, FIG. 2, and the polarity of the compensation, i.e., positive or negative, is entered in a compensation sign mechanism 34.

The mechanism 32 comprises a plurality, for example three, manually operable decimal-numbered thumbwheels and suitable logic circuitry for providing a parallel bit BCD output signal representative of various percentage settings of the thumbwheels. The sign of the compensation is similarly entered in the mechanism 34 and is translated thereby into an appropriate one of two different voltage output levels representative of positive and negative compensations, respectively.

In accordance with this invention, the placing of standards in the beam having a composite thickness which compensates for alloys in metal to be gauged is accomplished automatically by feeding a pair of pulse counters from a common pulse source, such as a clock oscillator, at relative rates which are a function of the desired ratio of the nominal to the apparent thickness of the alloy metal. When a fixed number of counts are counted, one of the two counters, referred to herein as the "X$a$ counter", contains a count corresponding to the apparent thickness factor of the ratio. This counter provides a voltage output which is fed to appropriately energize the standards magazine to insert standards in the beam which will attenuate the beam by the same amount as a nominal thickness of the alloyed metal to be gauged.

To illustrate, assume that the gauge is designed so that 0.100 inch of standards is represented by 1000 counts in a three decade counter referred to hereinafter as the "X counter". Further, assume that no alloy compensation is required to be made to the standards. In such case, the counters X and X$a$ are filled at equal rates by pulses from the oscillator. With a value of 0.100 inch in corresponding digital voltage form as the basis for comparison, 1000 pulses are counted by the X counter and the same number of pulses are counted by the X$a$ counter. With 1000 counts in the X$a$ counter, the standards magazine is energized to insert selected standards into the beam having a total thickness equal to the nominal and in this case, the apparent thickness, of the metal to be gauged, that is, a total of 0.100 inch of standards.

To further illustrate, if it is assumed that + 50% compensation is needed for the apparent thickness of the standards to appear equal in thickness to the nominal thickness of an alloyed metal to be gauged, the rate of the pulses fed to the X counter is reduced by one-third. Again assuming that 0.100 inch of metal is represented by 1000 counts in the X counter, 50% more pulses, that is, 1500 pulses, will be fed into the X$a$ counter when the X counter registers 1000 counts. The 1500 pulse count in the X$a$ counter represents 0.150" of standards and + 50% compensation is achieved by allowing the X$a$ counter to feed BCD voltage signals equivalent to 1500 counts into the standards magazine. The magazine solenoids then operate to insert 0.150" of standards into the beam.

As one further example, to effect + 100% compensation, the pulse rate from the oscillator is reduced by one-half and the X$a$ counter will therefore receive 2000 counts when 1000 counts are received by the X counter. The 2000 counts in the X$a$ counter corresponds to a metal thickness of 0.200 of inch and this thickness value is similarly set into the standards magazine by the X$a$ counter.

If negative compensation is desired, the X counter is caused to count to 1000 at a proportionally faster rate than the X$a$ counter. Thus, the X$a$ counter counts a proportionally fewer number and hence a proportionally smaller percentage of pulses than the X counter to provide a final count in the X$a$ counter proportional to the desired percent of negative compensation.

The following is a detailed description of circuitry and mechanism for automatically inserting into the beam such of the standards as will provide the desired percentage compensation.

An oscillator 36, FIG. 2, operates continuously to produce pulses at some suitable frequency, such as 10 MHz, and feeds these pulses to the parallel inputs of two counters 38 and 40. The counter 40 functions as a frequency divider to pulses received from the oscillator. Hence, if the counter comprises three decade counters interconnected to operate as a 1:1000 scaler and if driven by an oscillator 36 of 10 MHz frequency, it produces a train of output pulses scaled down in frequency to 10 KHz.

The counter 38 also counts a clock pulse input from the oscillator 36 and the BCD output signal from the percent compensation set-up 32. Counter 38 may comprise three presettable and interconnected decade counters and a divide-by-2 circuit comprising a J-K flip-flop. In such case the counter 38 operates as a 1:2000 frequency divider to the pulse output of oscillator 36 if it is programmed to 100 percent compensation from the compensation set-up 32. In accordance with a selected value or percentages of compensation, the divisor of the counter 38 may be programmed to range between 1000 and 2000 in its scaling. In effect, the counter 38 divides the pulse rate of the incoming pulses by a factor of 1000 + N, where N has an absolute value of 10 for each 1 percent of required compensation. Thus, for example, if 100% compensation is desired, N is made equal to 1000 and the counter 38 operates to sacle down the frequency of the clock pulses by a factor of 2000. On the other hand, if zero percent compensation is desired, N is made equal to zero and the counter 38 scales by 1000.

The sign set up 34 provides a 0 or 1 bit voltage level representing the polarity of the desired compensation factor. Also included as part of the sign set up 34 is a logic circuit indicated at B which is responsive to (1) positive or zero percent compensation in the sign set-up 34 to provide a direct circuit path coupling of the output pulses from the counter 38 through a dual-input NAND gate 42 to a coincidence counter 44 (the "X counter") and a direct circuit path coupling of the output pulses of the counter 40 through a second dual-input NAND gate 46 to a counter 48 (the X$a$ counter) and (2) negative percent compensation in the sign set-up 34 to switch the routing of the pulses to the counters 44 and 48 via the respective gates 42 and 46. Thus, the compensation set-up 32 and sign set-up are used to select a division ratio in the counter 38 and route the outputs of counters 38 and 40 in accordance with a dialed-in positive or negative percent compensation value, thereby conditioning the gauge for calibration for thickness measurements of a particular alloyed metal.

In the X counting sequence, counter 44 operates as a coincidence counting circuit and is programmed by parallel bit BCD thickness signals from the set-up mechanism 30 to count pulses received via the enabled gate 42 until a pulse count equivalent or numerically equal to the BCD thickness value is reached, whereupon a coincidence signal is generated and fed by way of a conductor 49 to a control system 50. The coincidence signal resets the X counting control 54 causing this circuit to produce an inhibit signal at terminal 55 and hence on a second input of NAND gate 42, thereby terminating any further flow of pulses to the counter 44. The inhibit signal also appears on OR gate 62 input connected to terminal 55 and on a second input of gate 46 to terminate further flow of pulses to the X$a$ counter 48. Thus, both the X and X$a$ counters are coincidentally inhibited from any further counting. The resetting of circuit 54 also triggers a high-voltage adjust control 56 to initiate the next mode of gauge calibration described subsequently.

The X$a$ counter 48 typically comprises four decade counters tandem-connected to count from 0000 to 9999 before overflowing and resetting to 0000. The output of this counter is a BCD signal X$a$, corresponding to the registered count, which count is representative of the apparent thickness of the material for which the gauge is to be calibrated. Coupling the ouputs of the X$a$ counter to the solenoids of the magazine 12 is a buffer storage register 61 having a transfer line coupled to the terminal 55. This register operates to transfer the BCD voltage outputs of the counter to the solenoids when the X counting control 54 is triggered into its reset state so as to energize those solenoids which will insert corresponding ones of the standards into the beam. The signal level transition which occurs at the terminal 55 when the control 54 resets is used directly or is appropriately delayed to provide a strobing signal which is fed by the transfer line 63 to the register 61 to effect the transfer of the X$a$ count to the magazine 12 solenoids.

The line 63 is coupled to the terminal 55 through a suitable time delay cicuit (not shown) which is responsive to the resetting of the control 54 but has a time constant long enough to ensure that the X$a$ counter stabilizes before the strobing pulse is produced at the delay circuit output. The delay circuit may, for example, comprise a monostable multivibrator which is triggered into an unstable state in response to the disabling voltage at the terminal 55 and upon returning to a stable state produces a spike strobing pulse on line 63. With the proper standards inserted in the beam, the intensity of radiation emanating from the inserted standards is sensed by the detector 14 and the output signal therefrom is linearized by the amplifier 16, as heretofore described. The amplifier 16 output is coupled through the variable gain amplifier 18 to an analog meter 20 to deflect a meter pointer to some position on the meter scale.

Having once compensated the standards it now becomes necessary to null the deviation indicator of the analog meter on the newly selected standards, otherwise the meter would remain nulled on the previously selected standards. A brief description of how this is accomplished follows.

The control 50, FIG. 3 is comprised of five flip-flop circuits connected in series. One of these flip-flops constitutes part of the start calibration control 52. This control is set by a step voltage received from a push button start switch (not shown) upon operative activation thereof. The calibrate flip-flop is set when the push button switch is activated and produces an output signal which in turn sets an X counting flip-flop in the X counting control 54. When the X counting flip-flop is set it produces a voltage signal at terminal 55, FIG. 2, which simultaneously enables gate 42 and 46.

With gates 42 and 46 enabled, the X counter counts to coincidence in the manner described above in parallel with the X$a$ counter. At count coincidence in the X counter, the X counting control 54, FIG. 3, is reset by a pulse on conductor 49 from that counter. When the X counting control 54 is reset, the voltage at terminal 55 changes level sufficiently to inhibit gates 42 and 46, thereby stopping the flow of pulses to the counters X and X$a$. Shortly after resetting, the X$a$ count, as equivalent BCD voltages, is transferred to the solenoids of the standards magazine by operation of the register 61.

The resetting of control 54 also operates to set the flip-flop of the high-voltage adjust control 56, FIG. 3, which in turn functions to adjust the kilovolt level of the source to provide a beam of sufficient intensity to null the meter 20 with only the newly inserted standards in the beam. To generate a beam of such intensity, the source voltage is repetitively adjusted in the following manner.

Since a null meter condition corresponds to a zero volt differential across the meter input terminals it is unlikely that this voltage will remain zero with the new thickness of standards inserted in the beam. For example, if the thickness of standards now in the beam is greater than previously in the beam, the intensity of radiation will be insufficient to penetrate the strip and therefore the voltage on one terminal of the meter 20 will not be zero but rather will have a corresponding magnitude and polarity. The voltage at this terminal is converted into a representative number of pulse counts by a voltage-to-pulse count type of analog-to-digital converter 64, FIG. 1, and delivered to a bidirectional counter 66; the number of counts delivered thereto being proportional to the absolute magnitude of the analog voltage on the meter input terminal. The converter 64 also provides an indication of the polarity of this voltage and this information is also fed to the counter 66 to condition it to count up or down depending upon the sign of this polarity. In the instant example, the counter 66 is designed to count up from some predetermined initial count.

The output of the counter 66, following each sampling time, is transferred to a null adjust storage register 68 which in turn feeds a digital-to-analog converter 70. This converter converts the digital output of the register 68 into an analog signal of equivalent magnitude and feeds this analog signal back to the regulating means 11 causing an adjustment of the source potential. In the instant example, the feedback signal causes the voltage of the source 10 to increase so as to increase the intensity of the beam. Alternatively, this feedback signal may be fed via a path 71A indicated by dash lines, to appropriately change the gain of the detector 14 to achieve meter nulling.

The servoing action provided by feedback loop 71 and associated components therefore drives the voltage at the input of the converter 64 toward zero volts and possibly through zero volts with the voltage changing polarity in the process, as the servoing action continues to provide subsequent null adjustments. A polarity change of the analog input signal supplied to the converter 64 is reflected by a change in the polarity output indication of the converter which is transmitted to the counter 66 and conditions the counter to count down rather than up. When the counter 66 counts down it reduces the count in the register 68 which in turn reduces the number of digital signals supplied to the converter 70. The converter 70, in turn, reduces the magnitude of the analog feedback voltage to the regulating means 11 causing a reduction in the intensity of the beam. This servoing action continues until the magnitude of the analog signal sampled by the converter 64 becomes essentially zero volts.

If after the converter 64 samples the analog voltage at the input of the meter 20 and the error between samples does not exceed a certain value, for example 0.01%, a verified null adjust signal will be transmitted by a verification circuit to the control 56. This signal resets the control 56 and thereby terminates further null adjustments.

The verification circuit which operates in this manner comprises two counters 80 and 82 which cooperate to provide a signal on conductor 83 indicative of the fact that sufficient source adjustment has been made and that the meter 20 is now nulled on the standards in the beam.

The following is a detailed description of one circuit arrangement for providing the automatic nulling of the meter on newly inserted standards. This arrangement includes the aforementioned analog-to-digital converter 64, the up-down counter 66, the high voltage null adjust storage register 68, the digital-to-analog converter 70 and feedback loop 71 coupling the converter 70 output to the control input of the regulating means 11 or the detector 14.

The converter 64 is a conventional bipolar, analog-to-digital converter of the voltage-to-pulse count type, which continuously operates to sample the analog signals applied to a meter input terminal to provide on conductor 72 a train of output pulses proportional in number to the magnitude of the sampled analog signal, and a leading 0 to 1 bit indication of the analog signal polarity, i.e., a positive or negative voltage with respect to ground potential. At the end of each conversion cycle a count transfer signal is generated by the converter and fed to a conductor 74 commonly coupled to one input each of dual-input AND gates 76 and 96.

The count outputs representing the magnitude of the analog voltage sampled by the converter 64 are transmitted by conductor 72 through an enabled AND gate 78 to the counter 66. The AND gates 76 and 78 are enabled by an enabling voltage from the high voltage adjust 56 at the beginning of this sequence; this enabling voltage appearing on a conductor 57 commonly connected to the inputs of both gates. At the completion of each conversion cycle, the count transfer signal is transmitted through the enabled gate 76 to the inputs of the register 68 to effect a parallel transfer thereto of the digital count accumulated by the counter 66. The ouput from the register 68 is fed to a conventional digital-to-analog converter 70 which produces an analog output signal of magnitude proportional to the count in register 68. The output of the converter 70 is fed back by a feedback loop 71 to the source regulator 11 to effect a proportionate increase (or decrease) in voltage level of the source 10 and hence a proportionate increase (or decrease) in the radiation intensity level of the beam emanating from that source.

The regulator 11 comprises a conventional D.C. power supply programmable to adjust a D.C. multiplied high voltage output to the source in accordance with a change in magnitude of the analog voltage on loop 71. The regulator 11 functions to maintain the voltage of the source 10 constant for a given reference voltage input. Thus, in response to the level of the analog output from the converter 70, the radiation intensity level of the source 10 will be varied to increase or decrease the input to the detector so as to bring the analog meter indicator to a null position. As mentioned, alternatively, the analog signal from the converter 70 could be applied to the detector 14 by way of loops 71 and 71A to suitably change its gain to null the meter 20.

At the end of each conversion cycle of the converter 64, the null adjust sequence is repeated until the meter is nulled. To detect nulls, the pulse counts and count transfer signals on conductors 74 and 72, respectively, are coupled to decade counters 80 and 82 respectively. The counter 80 is an up-down counter and controls the counter 82 by resetting it every time an overflow count condition occurs in counter 80. The counter 80 counts up or down in parallel with the counter 66 in directions determined by the polarity signal leading each pulse count transmitted by the converter 64 to the line 74 and overflows at a rate determined by its count capacity. The polarity signal is either a 1 or a 0 bit representing positive and negative polarities, respectively, with the counter 80 counting up when fed a leading 1 bit and counting down when fed a leading 0 bit. As the meter pointer deflects from null in one direction, the counts supplied to the counter 80 may be sufficient to produce an overflow pulse output which is used to reset the counter 82. As a zero deflection of the meter is approached, and/or the meter pointer oscillates about the midpoint of the scale, the count added to, or subtracted from, the counter 80 will e insufficient to produce an overflow in a given time interval and the counter 82 will then operate uninterrupted by reset signals from the counter 80 to count transfer signals from the converter 64.

As mentioned previously, the number of counts in the count transferred by the converter 64 is proportional to the absolute magnitude of the voltage on the meter 20 input terminal to which the converter is connected. Since it is desired to place the meter in a null condition, the greater the number of counts transferred at the end of a given conversion cycle, the greater the deviation of the meter 20 from its desired null. Therefore, a zero count on transfer represents a perfect meter nulling and a full-scale count on transfer usually represents large, unidirectional deviations from null.

The count transfer pulses produced by the converter 64 become less aperiodic as the count output of the converter converges to zero, so that when a perfect null is achieved the count transfer signals will be produced periodically. With the counter 82 counting successive transfer signals from the converter 64 and the counter 80 coincidentally counting the number and polarity of counts produced by the converter during the time intervals between two successive transfer signals, by properly scaling the counters 80 and 82, the counter 80 can be designed to reset the counter 82 before the counter 82 reaches its full count capacity until the output count of the converter becomes zero or sufficiently near zero to provide the desired calibration accuracy. When this latter condition is achieved, the counter 82 is permitted to count a predetermined number of consecutive transfer signals without being reset in the interim by counter 80 overflow signals. When this predetermined number of transfer signals is counted, the counter 82 overflows and produces a signal on line 83 which operates to terminate the null verification adjust sequence.

In a typical embodiment, the counter 80 comprises a programmable single decade counter programmed to overflow on receiving a net count of + 20. The counter 82 comprises two programmable decade counters connected in series to overflow upon receiving 40 consecutive transfer signals.

When the counter 82 overflows without being reset in the interim by the counter 80, it produces a signal on the conductor 83. This signal resets the adjust control 56 to its initial condition. In this condition, the control 56 produces a voltage on conductor 56 which inhibits the gates 76 and 78 thereby stopping further operation of the null adjust sequence and also transmits a triggering pulse to the percent Xa thickness control 58 which sets the flip-flop of that control for reasons which will now be related.

After verifying the accuracy of the null produced during the null adjust sequence and with the adjustment of the source 10 or the gain of the detector 14 now fixed, it is necessary to calibrate the meter 20 over expected ranges of thickness deviations of the strip material from nominal thickness. The maximum ranges are typically the full scale ranges of the meter 20. If this were not done, it would be practically impossible to relate displacement of the meter 20 pointer to actual values of strip thickness deviations inasmuch as the gauge was not hitherto calibrated to the desired ranges of measurement with respect to the new nominal thickness. This sequence of calibration may be characterized as a "range adjust" sequence since it contemplates adjusting the meter range. Specifically, range adjustment is accomplished by adjusting the gain of a variable gain device in the detector circuit, that is, the amplifier 18.

Briefly, this is accomplished by controlling the X and X$a$ counters by another counter 90 which counts pulses from the oscillator 36 at a rate corresponding to the maximum normal deviation of strip thickness from nominal. With the high voltage source 10 or the detector gain fixed at the end of the null adjust sequence, the X$a$ counter has a count added to it which represents this maximum preselected deviation. Typically, the deviation is expressed as a percent deviation from nominal. With the X$a$ counter updated by this count value, the standards magazine is once again energized by the output of the X$a$ counter to insert other standards into he beam which correspond to the selected percent deviation in thickness.

Through operation of certain of the circuits previously employed in the null adjust sequence and other circuits, an analog voltage is applied to a range adjust feedback loop 99, FIG. 1, and hence to the amplifier 18 to change the gain of the amplifier in a direction and by an amount which will cause a predetermined deflection of the meter indicator from null. These changes of gain may be performed by varying a variable resistor in the amplifier feedback loop. Typically, this predetermined deflection is a full scale deflection of the meter indicator in one direction from null. A verification of the sensitivity of the meter to thickness variations is provided by the converter 64 operating again in conjunction with the counter 80 and 82 in a manner similar to that described for the high voltage adjust sequence. Once the meter 20 is calibrated to, for example, a positive full scale indicator deflection, it is relatively simple matter to calibrate to a negative full scale indicator deflection since symmetry exists with respect to a scale midpoint in meters possessing linear response characteristics.

A detailed description of the circuitry for automatically performing the range adjust sequence follows.

During the null adjust sequence wherein the X$a$ counter is loaded to the BCD apparent thickness value of a strip to be measured, the pulses passing through gate 46, FIG. 2, are also fed to the input of a percent X$a$ thickness divider 84 and to one input of a NAND gate 86. The divider 84 comprises two decade counters which are programmable in advance to the range of thickness deviation from nominal and to provide a full scale deflection of the meter 20 over this range. The divider 84 may be programmable by a % X$a$ set-up mechanism 85 comprising a plurality of switches which may be selectively closed to program the scaling factor of the divider 84 to any desired percentage. Alternatively, a divider may be employed without programming to scale its count input by a constant factor. Illustratively, if a 10 percent deviation is desired, the divider 84 provides one output pulse for each ten counts received and thereby provides a count output which is ten percent of the pulse count fed to the X$a$ counter.

The percentage pulse count is coupled through a NAND gate 88, which during the X counting sequence is enabled by the X counting control 54 in its set state. These pulses are passed by the enabled gate 88 to the count-up input of the counter 90. The counter 90 is comprised of a plurality of decade counters connected in series to provide an appropriate full house count capacity of, for example, 999. Thus, during the counting sequence, the counter 90 fills to a count equal to the programmed percentage (exemplified as 10%) of the count in the X$a$ counter.

At the termination of the null adjust sequence the percent X$a$ thickness control 58 is triggered into its set state causing a gate enabling signal to be generated by the control 58. This signal is transmitted to a terminal 91 to enable NAND gate 86 and moreover passes through gate 62 to again enable gate 46. Pulse counts then flow respectively through the gate 86 to the count-down input of the counter 90 and directly to the X$a$ counter. The detector 92 is responsive to the count output of the counter 90 to provide a signal output when the counter registers full house zero's. This signal is applied by a conductor 93 to reset the percent X$a$ thickness control 58. When reset the control 58 produces a signal on conductor 91 which inhibits the gates 46 and 86 to terminate further pulse flow to the counters X$a$ and 90. By this sequence, the programmed percentage of the initial X$a$ count, as provided by the divider 84 changes the previous count in the X$a$ counter by that percentage.

Like the terminal 55, the terminal 91 is also connected to the transfer line 63 of the register 61 via the aforedescribed time delay circuit so that upon resetting of the control 58, the signal transmitted by conductor 91 is also used to initiate the transfer of the updated X$a$ pulse output in BCD form to the solenoids of the standards magazine. Certain ones of the solenoids are then energized such that BCD value of the total number of standards displaced into the beam path is equal to the new BCD count value in the X$a$ counter 48. Thus, the new deflection of the meter should now correspond to a 10% change in the original thickness value as programmed by the thickness set-up 30 and the compensation set-up 32. In the gain adjust sequence next following, the gain amplifier 18 is altered to cause the meter 20 to deflect full scale for the assumed thickness deviation range of 10%. Resetting the percent X$a$ thickness control 58 sets the gain adjust control 60 to commence operation of a range adjust feedback loop 99 and hence the range adjust sequence.

As heretofore described the voltage across the analog meter is sampled by converter 64 and converted into a digital count proportional to the magnitude thereof. In the adjust sequence now described the digital output of the converter 64 is applied to a digital subtraction circuit 94 having its output coupled to the input of the counter 66.

The circuit 94 comprises four series-connected up-down binary counters which are resettable to an initial starting count of 0000 by a reset signal applied to the conductor 95 by the gain adjust control. This reset signal also appears on one input of an AND gate 96 to enable that gate. Followng reset, the circuit 94 operates to provide a digital output representative of the difference in count between the actual measured count output of the converter 64 and the full scale count output of the converter corresponding to a full scale deflection of the meter 20. To illustrate, assume that the converter 64 is designed to provide an output of 1000 counts in response to an analog voltage magnitude corresponding to a full scale deflection of the meter 20 pointer but that the converter actually produces a count of 800 corresponding to 0.8 of full scale meter deflection. In such case, the circuit 94 will produce a pulse output corresponding to the difference between the two counts, or 200 counts. These 200 counts are fed serially to the counter 66 during the analog-to-digital conversion cycle. At the end of each conversion cycle, the count transfer signal from the converter 64 is coupled through enabled AND gate 96 to activate a buffer storage register 98 in the gain-adjust feedback loop 99. The register then receives and stores the final transferred count from the counter 66. The contents of the storage register 98 is then fed to a digital-to-analog converter 100 which converts the digital count in the register 98 to an analog signal of proportional magnitude. This analog signal is fed back to the amplifier 18 to change the gain of the amplifier and hence the voltage output of the amplifier in a direction and by an amount which will provide a full scale deflection of the meter 20 indicator. In the illustrative example, the gain of the amplifier is increased by a value corresponding to 200 counts in the converter 64. This increases the magnitude of the analog signal fed to the input of converter 64 by a proportional amount. Thus, in the next conversion cycle the count of the converter 64 reflects the incremental increase of the analog input signal magnitude and produces an output pulse count of substantially 1000 counts corresponding to a full scale value of analog input to the converter 64 and hence across the input terminals of the meter 20. The pulse output from subtraction circuit 94 is also applied to the up-down pulse counter 80 in the null sensing circuit which now operates as follows to detect a condition of full scale meter deflection. During gain adjustment, deflection of the analog meter indicator causes a count output from the circuit 94 in excess of the number required to overflow the counter 80 and thereby reset the counter 82. As a full scale deflection of the meter 29 is approached, and/or the meter indicator oscillates about the full scale deflection point, the output of the circuit 94 and thus the count added to or subtracted from that in the counter 80 will be insufficient to produce an overflow condition and the counter 82 will then operate to count the transfer pulse signals. The sequence for range adjust verification is identical to that heretofore described for verification of null adjust.

After a predetermined number of adjustment cycles without a reset signal, an overflow signal is transmitted from the counter 82 to the gain adjust control 60 via conductor 97. This signal resets the control 60, which in turn produces a voltage level on conductor 95 which resets the subtraction circuit 94 and inhibits the gate 96 thereby terminating the range adjust sequence. The start calibration control 52 is also triggered to reset.

At the completion of the range adjust sequence a ground voltage signal from the now-reset calibration control 52 is applied to all solenoids of the standards magazine 12 via a conductor 103. This voltage restores all solenoids to an initial state whereby all thickness standards are removed from the radiation path.

With the strip material positioned in the gauge so as to intercept the radiation beam, the radiation attenuation by the strip is sensed by the detector 14, and an analog output signal is processed through the amplifiers 16 and 18 to provide a driving voltage for the meter 20.

To recalibrate the gauge for a different nominal thickness of material, the compensation set-up 32 and thickness set-up 30 are again programmed to the percent compensation and thickness values desired. The start push button (not shown) is again depressed to produce a voltage on line 105 which sets the start calibration control 52. In response to being triggered into this state, the control 52 produces delayed reset signals which are applied to both the X and X$a$ counters via a conductor 104. A triggering signal is also transmitted to set the X counting control 54 causing the initiation of the X counting sequence and another calibrating sequence.

It will thus be seen that through a unique combination of counters and converters a complete, accurate and automatic calibration of a radiation thickness gauge is obtainable.

What is claimed is:

1. An automatic calibrating thickness measuring system comprising
   first means including a source of radiation and radiation detecting means for receiving radiation transmitted along a radiation path from said source and for producing an electrical signal represenative of the level of radiation received;
   a standards magazine responsive to an electrical control signal to place at least one radiation-attenuating standard in said path;
   second means for producing a first electrical control signal in response to a programmed anticipated first total thickness value and for coupling said signal to said standards magazines;
   means coupled to the output of said radiation detecting means for indicating the level of electrical signal supplied thereto, said means including adjustable gain means;
   means coupling the indicating means to said first means for generating a first feedback signal representing the level of electrical signal supplied to the indicating means, said first means being responsive to said feedback signal to drive the indicating means to indicate a first preselected value;
   means responsive to said indicating means indicating substantially said first value for terminating said feedback signal and for causing said second means to produce a second electrical control signal respresentative of a preselected deviation from said anticipated thickness value,
   said standards magazine being responsive to said second control signal to place at least one standard having a second total thickness in said path; and
   means for generating a second feedback signal to said adjustable gain means to adjust the gain thereof until said indicating means indicates a second preselected value with said second thickness in said path.

2. A system according to claim 1 wherein said second means comprises
   a source of pulses;
   a first pulse counter;
   a second pulse counter;

means for programming said first pulse counter to produce a counter output signal after counting a given number of pulses;

first and second pulse divider means for feeding pulses from said source to said first and second counters, the divisors of the two divider means and the programming of said first counter controlling the ratio of the number of pulses counted by said second counter to the given pulse number as programmed in said first counter; and menas responsive to said counter output signal of said first counter for applying a signal representative of the count in said second counter to said standards magazine as said first control signal.

3. A system according to claim 2 wherein said second means further comprises a third, bidirectional counter;

third divider means for supplying to one input of said third counter a portion of the number of pulses delivered to said second counter to cause said third counter to count in a first direction from a datum count when said first counter is counting to said given number; and a gated path for delivering to a second input of said third counter the same number of pulses as is delivered to said second counter to cause said third counter to count in a direction opposite said first direction;

and wherein said means responsive to said indicating means renders said gated path conductive and causes pulses to be delivered to said second and third counters until said third counter returns to said datum count, the count registered by said second counter representing said second control signal.

4. A system according to claim 1 wherein said means responsive to said indicating means includes, a repetitive analog-to-digital converter for receiving as an input the electrical signal supplied to said indicating means and for producing a pulse train output having a number of pulses proportional to the magnitude of the electrical signal and a converter output signal signifying the performance of each conversion;

a first counter having a reset capability for counting the converter output signals and producing an output if said first counter counts a predetermined number of said converter output signals without being reset in the counting interim; and a second counter connected to count the pulses in each pulse train output from said converter and to reset said first counter each time a fixed number of pulses are counted by said second counter.

5. A system according to claim 4 and further comprising means connectable between said converter and said second counter when said standard having said second total thickness is in said path for accepting the pulse output of said converter and for subtracting the number of pulses in each pulse train from a preselected number, whereby said first counter produces said output.

6. A thickness measuring gauge comprising, a source of radiation, a standards magazine mounting a plurality of radiation-attenuating standards of predetermined thickness values, each of said standards being movable into a path of said radiation in response to a signal representative of a selected standard thickness, detection means mounted in said path of radiation for providing an analog electrical signal output having a magnitude which is a function of the radiation absorption characteristic of the material in said path, an analog meter coupled to said detection means for providing a visual display of changes in analog signal mangitude;

first means programmable to provide a first signal representative of the nominal thickness of the material to be measured;

second means programmable to provide a second signal representative of differences in the radiation absorption characteristics of the material to be measured and the standards material;

third means responsive to said first and second signals to provide a digital output signal representative of the nominal material thickness value compensated by the radiation absorption characteristics of the material to be measured;

fourth means coupling said third means to said standards magazine and actuated by said digital output signal of said third means for selectively inserting a standard into said radiation path having a total thickness as represented by said digital output signal;

fifth means including a first feedback circuit operative with said standard in said radiation path for producing analog signal levels at the output of said detector means which tend to drive said meter to a null condition, said fifth means including a circuit which produces predetermined digital output signals when said condition obtains;

sixth means coupled to said fourth means and to said fifth means and responsive to said predetermined digital output signals of said fifth means for actuating said fourth means to insert another standard into said radiation path corresponding to a predetermined value of material thickness deviation from nominal, and seventh means including a second feedback circuit coupling said circuit of said fifth means to said detection means and operative to drive said meter to indicate said predetermined value of thickness deviation.

7. In a measuring system, apparatus for detecting the existence of a preselected signal level at a point in an electrical circuit, within a determinable tolerance, the apparatus comprising:

an analog-to-digital converter for receiving as an input the signal level at the point, and for producing by the end of each conversion cycle a group of pulses representative of the input signal level, and a converter signal signifying the cycle during which a pulse count of the group is produced;

a first resettable counter connected to said converter for counting each converter signal and for producing a counter output signal each time the number of converter signals counted by said first counter exceeds a first predetermined number, said output signal being indicative of the arrival of the input signal at said signal level; and a second counter connected to said converter to count the pulses of each group and to reset said first counter in response to said second counter counting a given number of counts before said first counter produces a counter output signal; and wherein said converter is responsive to signal levels at said point of positive and negative polarity, and associates with each group of pulses a signal indication of the polarity of the received signal level, and wherein said second counter is bidirectional with the directions of counting determined by the polarity associated with each group of pulses, whereby said given number of counts is a net pulse count of the same polarity.

8. The measuring system according to claim 7 wherein said converter output signal is a count transfer signal produced at the end of each conversion cycle, and wherein said given number of counts is less than the number of successive transfer signals which produce a counter output signal from said first counter.

9. A method of automatically calibrating a non-contacting thickness measuring apparatus comprising the steps of
 a. selecting a nominal value of thickness for the material to be measured and a compensating factor based on the alloy content of the material;
 b. irradiating a standard sample having a thickness equivalent to the compensated nominal thickness to be measured;
 c. producing an analog representation of the level of radiation emerging from the standard sample while concurrently
 d. calibrating the apparatus to establish the analog representation at a first desired value by a repetitive process of;
 e. sampling the analog representation, converting the magnitude and polarity of each sample into a representative digital number, comparing each digital number to a signal number representative of the first desired value, adjusting the apparatus until the two digital numbers are of substantially the same magnitude and terminating calibration when the adjustment is effected.

10. The method according to claim 9 which further comprises the steps of:
 f. selecting the second value of material thickness representative of the maximum anticipated deviation from the nominal thickness value;
 g. irradiating a second standard sample having a thickness equivalent to the compensated maximum deviation of the material to be measured;
 h. producing an analog representation of the level of radiation emerging from the second standard sample; and then
 i. calibrating the apparatus to establish the latter analog representation at a second desired value by the process of (e).

11. A thickness measuring gauge comprising:
 gauging means including a source of radiation and a radiation detector adapted to receive radiation transmitted along a radiation path from said source for producing an analog output signal functionally related to the level of radiation received, said received radiation having a magnitude which is a function of the radition absorption characteristic and thickness of the material in said path;
 means for adjusting the operating level of said output signal;
 means for adjusting the rate of variation of said output signal;
 a standards magazine mounting a plurality of radiation-attenuating movable standards of predetermined thickness values;
 means for selectively inserting said standards into said path of radiation in response to signals representative of respective selected standard thicknesses;
 means for converting said analog output signal into a digital output signal;
 a first feedback circuit operable upon insertion in said radiation path of a first one of said standards having a composite thickness representative of a selected thickness value corresponding to that of the material to be measured and including means responsive to a first difference between the value of said digital output signal and a first predetermined digital value for controlling said operating level adjusting means to drive said digital output signal toward said first predetermined value for said selected thickness; and
 a second feedback circuit operable upon a second one of said standards being in position in said radiation path after termination of said first feedback circuit operation, said second standard having a composite thickness differing from the composite thickness of the first standard by an amount corresponding to a selected value of material thickness deviation, including means responsive to a second difference between the value of said digital output signal and a second predetermined digital value for controlling said rate of variation adjusting means to drive said digital output signal toward said second predetermined digital value for said selected value of material thickness deviation.

12. The gauge of claim 11, wherein said operating level adjusting means includes means responsive to said first mentioned controlling means for adjusting the level of radiation emitted by said source of radiation.

13. The thickness measuring gauge of claim 11, wherein said first difference responsive means includes first means for storing a digital value to modify adjustment of said operating level adjusting means, said second difference responsive means includes second means for storing a digital value to modify adjustment of said rate of variation adjusting means, and said first and second feedback circuits include a common bidirectional counter operatively coupled to said converting means for counting first train pulses corresponding to said first difference during operation of said first feedback circuit to transfer a resulting count to said first storing means and for counting second train pulses corresponding to said second difference during operation of said second feedback circuit to transfer a resulting count to said second storing means, the direction of counting depending upon the polarity of the first and second differences respectively.

14. The thickness measuring gauge of claim 11, wherein said analog-to-digital converting means is responsive to said analog output signal during repeating conversion cycles for producing as said digital output signal a pulse train output having a number of pulses proportional to the magnitude of said analog output signal, and a conversion signal corresponding to each conversion cycle, and comprising:
 a resettable first counter connected to said converter to count the conversion signals and produce a first digital control signal each time the number of conversion signals counted by said first resettable counter exceeds a first predetermined number; and
 a second counter for counting pulses corresponding to said first and second difference respectively and coupled to said first counter to reset the same upon said second counter counting a second predetermined number of pulses before said first counter produces said first digital control signal, said first digital control signal thereby indicating upon completion of a number of such conversion cycles at least equal to said first predetermined number that the respective difference has been substantially nulled.

15. A thickness measuring gauge comprising: a gauging unit including a source of radiation and a radiation detector for receiving radiation transmitted along a radiation path from said source and for producing an signal output functionally related to the level of radiation received, said received radiation having a magnitude which is a function of the radiation absorption characteristics and thickness of material in said path;

standards means for selectively establishing a plurality of radiation-attenuating movable standards of predetermined thickness values;

first means programmable to provide a first representation of the nominal thickness of the material to be measured;

second means programmable to provide a second representation of differences in the radiation absorption characteristics of the material to be measured and of the standards; and means responsive to said first and second representations for producing a standard control signal representative of the nominal material thickness compensated for the differences in the radiation absorption characteristics of the material to be measured and of the standards, said standards means being responsive to said standard control signal for selectively establishing one of said standards having a composite thickness represented by said standard control signal.

16. The thickness measuring gauge of claim 15 wherein said standard control signal producing means comprises:

a clock pulse generator;

a first pulse counter programmed by said first programmable means to produce a reference count signal upon counting a given number of pulses;

a second pulse counter;

first and second pulse divider means for feeding pulses from said generator to said first and second pulse counters respectively, at least one of said pulse divider means having a divisor responsive to said second programmable means; and means responsive to said reference count signal for interrupting counting by said second pulse counter, to produce said standard control signal corresponding to the count in said second pulse counter upon interruption of the counting thereof.

17. The thickness measuring gauge of claim 16, wherein said standard control signal producing means comprises:

a bidirectional third counter;

third divider means for supplying said bidirectional third counter with a selected portion of the number of pulses delivered to said second pulse counter to cause said bidirectional third counter to count in a first direction from a datum count until said first pulse counter reaches said given number;

a gated path for enabling further delivery of pulses to said second counter and causing said bidirectional third counter to count these further pulses in a second direction opposite said first direction; and means responsive to said bidirectional third counter returning to said datum count for disabling said gated path to interrupt delivery of said further pulses and to produce another standard control signal representative of the count registered by said second pulse counter to activate said standards means to establish another of said standards in said radiation path.

18. The thickness measuring gauge of claim 15 comprising:

a first feedback circuit coupled to said gauging unit and operable upon insertion in said radiation path of said one standard for adjusting an operating parameter of said gauging unit to drive said output signal toward a first predetermined value for said compensated nominal thickness;

means responsive to said output signal taking said first predetermined value and coupled to said standards means for establishing another one of said standards having a composite thickness differing from that of said one standard by a predetermined compensated value of material thickness deviation from nominal to be placed in said radiation path; and a second feedback circuit operative after said other standard has been established in said path for adjusting a rate of amplification of said output signal to drive the same toward a second predetermined value for said compensated value of material thickness deviation.

19. A method for calibrating a non-contacting thickness gauge for a given material having a nominal thickness, said gauge having a gauging unit including a source of radiation and a radiation detector for receiving radiation along a path from said source and for producing a signal output functionally related to the level of radiation received, said received radiation having magnitude which is a function of the radiation absorption characteristics and thickness of a material in said path, comprising:

a. selecting a first calibration standard having a thickness equal to the nominal thickness value of the given material to be gauged compensated for difference between the radiation absorption characteristics of the given material and of the standard material;

b. irradiating said first standard in said path; and c. automatically adjusting the value of an operating parameter of said gauging unit to bring the output signal to a first predetermined level.

20. The method of claim 19 further comprising:

d. irradiating a second standard having a thickness differing from that of said first standard by an amount corresponding to a selected nominal thickness deviation of the material to be gauged compensated for said difference in radiation characteristics; and e. automatically adjusting a rate of amplification of the output signal to bring the same to a second predetermined level.

21. The method of claim 19, wherein said step of selecting comprises:

producing a digital representation of the nominal thickness value of the given material;

producing a digital representation of a compensating factor based on said difference in the radiation absorption characteristics; and modifying said nominal thickness digital representation by said compensating factor digital representation for producing a digital representation of said compensated nominal thickness value.

22. A method of calibrating a non-contacting thickness gauge for a material to be gauged, said gauge having a gauging unit including a source of radiation and a radiation detector for receiving radiation transmitted along a path from said source and for producing a signal output functionally related to the level of radiation received, and said received radiation having a magnitude which is a function of the radiation absorption characteristic and thickness of material in said path, comprising:

irradiating a first calibration standard having a thickness equal to a first selected thickness of the material to be gauged compensated for difference in the radiation absorption characteristics of the material to be gauged and of the calibration standard, to produce a first resulting signal output from the radiation detector; and using said first resulting signal output to calibrate the gauge for the material to be gauged.

23. The method of claim 22, further comprising the steps of:

irradiating a second calibration standard having a different thickness equal to a second selected thickness of the material to be gauged compensated for said difference in radiation absorption characteristics to produce a second resulting signal output from said radiation detector; and using said second resulting signal output to further calibrate the gauge for the material to be gauged.

24. The method of claim 23, wherein said second resulting signal output using step comprises automatically adjusting a parameter of gain of the radiation detector to bring the second resulting signal output to a second predetermined level.

25. The method of claim 22 comprising prior to said first standard irradiating step:

producing a representation of said first selected thickness;

producing a representation of a compensating factor based on said difference in the radiation absorption characteristics;

modifying said first selected thickness representation by said compensating factor representation for producing a signal representative of an apparent value of the first selected thickness of the material to be gauged; and inserting said first standard in the path of radiation from said source to said detector in response to said apparent thickness representative signal.

26. The method of claim 22, wherein said first resulting signal output using step comprises automatically adjusting an operating parameter of the gauging unit to bring said first signal output to a first predetermined level.

27. The method of claim 26, further comprising:

irradiating a second calibration standard having a different thickness corresponding to selected deviation of the first selected thickness of the material to be gauged compensated for said difference in radiation absorption characteristics to produce a second resulting signal output from said radiation detector; and automatically adjusting a parameter of gain of the radiation detector to bring the second resulting signal output to a second predetermined level.

28. A thickness measuring gauge comprising:

a gauging unit including a source of radiation and radiation detecting means for receiving radiation transmitted along a radiation path from said source and for producing an output signal functionally related to the level of radiation received, said received radiation having a level which is a function of the radiation absorption characteristic and thickness of material in said path; and means for calibrating the gauge prior to inserting a material to be gauged in the radiation path, including:

means for selectively establishing radiation attenuating standards of predetermined thickness values in the path of radiation, and control means responsive both to a signal representative of a selected thickness of a material to be gauged and to a signal functionally related to the difference in radiation absorption characteristics of the material to be gauged and of the standards for activating said selective establishing means to establish in said radiation path such a standard having a thickness equal to the apparent value of the selected thickness of the material to be gauged, so that the resulting output signal produced by said detecting means may be used in calibrating the gauge.

29. The gauge of claim 28, comprising first settable means coupled to said control means for producing said signal representative of the selected thickness of a material to be gauged; and second settable means coupled to said control means for producing said signal functionally related to the difference in absorption characteristics of a material to be gauged and of said standards.

30. The gauge of claim 28, comprising means for automatically adjusting the value of an operating parameter of said gauging unit in response to the output signal produced by said detecting means after said standard having said apparent thickness value has been established in said radiation path to bring said output signal to a predetermined level.

31. The gauge of claim 28, comprising means for reactivating said standards establishing means after said standard has been established for establishing in said radiation path a second such standard having a thickness equal to the apparent value of a second selected thickness of the material to be gauged, so that the resulting output signal produced by the detecting means may be used in calibrating the gauge.

32. The gauge of claim 31, wherein said second selected thickness corresponds to a predetermined percentage deviation from the selected thickness of the material to be gauged.

33. The gauge of claim 31 comprising means operative after said second standard has been established for automatically adjusting the rate of variation of the output signal produced by said detecting means, until said output signal reaches a second predetermined level.

34. The gauge of claim 28, wherein said control means comprises:

first means for counting clock pulses at a first rate, second means for counting the clock pulses at a second rate, at least one of said counting means being adjustable for setting the ratio of said second rate to said first rate for each material to be gauged at a compensation value corresponding to said difference in radiation absorption characteristics, third means for counting pulses issued from one of said first and second counting means at the respective rate up to a selected count corresponding to the selected thickness of the material to be gauged, and fourth means for counting pulses issued from the other of said first and second counting means at the respective rate to produce an output count representative of the apparent value of the selected thickness, in response to said third means reaching said selected count.

35. A method for calibrating a thickness measuring system including gauging means having a source of radiation and radiation detecting means for receiving radiation transmitted along a radiation path from said source and producing an output signal functionally related to the level of radiation received by said radiation detecting means, said received radiation level being a function of the radiation absorption characteristics and thickness of material in said radiation path, comprising the steps of:

producing a first representation of a first thickness value;

inserting into said radiation path a first thickness standard in response to said first representation to obtain a first value of said output signal corresponding to said first thickness value;

producing a second representation of a predetermined deviation from said first thickness value;

producing a third representation of a second thickness value corresponding to said predetermined deviation from said first thickness value in response to said first and second representations;

establishing in said radiation path a second thickness standard in response to said third representation to obtain a second value of said output signal corresponding to said second thickness value; and calibrating the system in response to said first and second output signal values to reference indications of thickness variations produced in response to the output signal when a material is in said path with respect to said first and second thickness values.

36. The method of claim 35, wherein said first signal is a count and said second signal is another count derived in response to said first count and representing a thickness deviation from said first thickness value corresponding to a predetermined percent variation thereof.

37. In a thickness measuring apparatus including:

gauging means, having a source of radiation and radiation detecting means for receiving radiation transmitted along a radiation path from said source and producing an output signal functionally related to the level of radiation received by said radiation detecting means, said received radiation level being a function of the radiation absorption characteristics and thickness of material in said radiation path; and means for selectively establishing in said path of radiation a plurality of radiation attenuating standards of predetermined thickness values; the calibration system comprising first calibrating means responsive to said output signal and operable after a first one of said standards having a composite thickness selected in accordance with the nominal thickness of a material to be gauged has been established in said radiation path for performing a first calibration of the apparatus for said nominal thickness, means automatically operable after said first calibration has been performed for producing a control signal to cause said standards establishing means to establish a second one of said standards the composite thickness of which exhibits a predetermined deviation from that of said first standard, and second calibrating means responsive to said output signal and operable after said second standard has been established in said radiation path for performing a second calibration of the apparatus.

38. The system of claim 37, wherein said control signal producing means is responsive to termination of said first calibration step for producing said control signal and said second calibrating means is responsive to said control signal producing means to effect said second calibration after said second standard has been established in said radiation path.

39. The system of claim 37, comprising means responsive to indications of nominal thickness of the material to be gauged and of compensation for differences in radiation absorption characteristics of the material to be gauged and of said standards for activating said standards establishing means to establish as said first standard in said path a standard having a thickness equal to the apparent thickness of the material to be gauged.

40. In a thickness measuring apparatus including:

gauging means, having a source of radiation and radiation detecting means for receiving radiation transmitted along a radiation path from said source and producing an output signal functionally related to the level of radiation received by said radiation detecting means, said received radiation level being a function of the radiation absorption characteristic and thickness of material in said radiation path, the calibration system comprising:

means for selectively establishing in said radiation path first and second radiation attenuating standards of respective first and second thicknesses in response to first and second control signals respectively;

first calibrating means responsive to said first control signal and to said output signal for performing a first calibration of the apparatus after said first standard has been established in said path;

means for producing a representation of said second thickness which corresponds to a predetermined deviation from said first thickness to enable said establishing means to establish said second standard in said path in response to said second control signal after said first calibration has been performed; and second calibrating means responsive to said second control signal and to said output signal for performing a second calibration of the apparatus after said second standard has been established in said path.

41. The system of claim 40, including means for producing a representation of said first thickness to enable said establishing means to establish said first standard in said radiation path in response to said first control signal, and wherein said second thickness representation producing means is responsive to said first thickness representation.

42. The system of claim 41, wherein said second thickness representation producing means include means responsive to said first thickness representation for producing a representation of thickness change corresponding to said predetermined deviation to determine said second thickness representation.

43. The system of claim 40, including means responsive to termination of said first calibration for producing said second control signal to enable said establishing means to establish said second standard in said path.

44. The system of claim 40, wherein said first calibrating means includes means for adjusting the level of operation of said output signal, a first feedback circuit responsive to said adjusted output signal for controlling said adjusting means and means responsive to said first control signal for activating said first feedback circuit;
said second calibrating means includes gain means for adjusting the rate of variation of said output signal, a second feedback circuit responsive to said gain adjusted output signal for controlling said gain means, and means responsive to said second control signal for activating said second feedback circuit; and
including means responsive to stabilization of said level adjusting means under control of said first feedback circuit for terminating operation of said first feedback circuit and producing said second control signal after said second thickness representation has been produced.

45. The system of claim 40, wherein at least one of said calibrating means includes means for adjusting the level of radiation received in response to one of said first and second standards in said path.

46. In thickness measuring apparatus including: gauging means having a source of radiation and radiation detecting means for receiving radiation transmitted along a radiation path from said source and producing an output signal functionally related to the level of radiation received by said radiation detecting means, said received radiation level being a function of the radiation absorption characteristics and thickness of material in said radiation path: and means for selectively establishing radiation attenuating standards in said path of radiation; the calibration system comprising:
means for producing a first control signal to cause said standards establishing means to establish in said path a first one of said standards having a first selected thickness,
means responsive to the value of said output signal after said first standard has been established in said radiation path for initially calibrating the apparatus for said first selected thicknes,
means responsive to a representation of said first selected thickness for producing a second control signal to cause said standards establishing means to establish in said path a second one of said standards having a second thickness corresponding to a predetermined deviation from said first thickness, and
means responsive to the value of said output signal after said second standard has been established in said radiation path for completing the calibration of said apparatus with reference to said selected first thickness and predetermined deviation therefrom.

47. In a thickness measuring apparatus including: gauging means having a source of radiation and radiation detecting means for receiving radiation transmitted along a radiation path from said source and producing an output signal functionally related to the level of radiation received by said radiation detecting means, said received radiation level being a function of the radiation absorption characteristics and thickness of material in said radiation path; and means for selectively establishing radiation attenuating standards in said path of radiation in response to respective representations of standard thickness values; the calibration system comprising:
means for producing a first representation of a first selected standard thickness value;
means responsive to said first representation for producing a second representation of a second standard thickness value corresponding to a predetermined deviation from the first standard thickness value; and
means responsive to the values of said output signal corresponding to first and second standards of respective first and second thickness values established in the radiation path by said establishing means in response to said first and second representations respectively for calibrating the apparatus with reference to said first and second thickness values.

48. The system of claim 47, wherein said first representation producing means is presettable to said first selected standard thickness value.

49. The system of claim 47, comprising presettable means coupled to said second representation producing means for selectively adjusting said predetermined deviation.

50. The system of claim 47 wherein said predetermined deviation is a percentage deviation of said first thickness value and said second representation producing means comprises means for producing a representation of a thickness deviation corresponding to said percentage.

51. In a thickness measuring apparatus including gauging means having a source of radiation and radiation detecting means for receiving radiation transmitted along a radiation path from said source and producing an output signal functionally related to the level of radiation received by said radiation detecting means, said received radiation level being a function of the radiation absorption characteristics and thickness of material in said radiation path; and a standards magazine for selectively establishing in said path a plurality of radiation attenuating standards of predetermined thickness values;
the calibration system comprising:
means for producing a representation of a first thickness;
means for converting said representation into a first count representative of the thickness of a first one of said standards;
means for energizing said standards magazine in response to said first count to establish said first standard in said radiation path;
means for converting said thickness representation into a second count representative of a thickness difference which is a predetermined function of said first thickness;
said energizing means being responsive to said second count to insert into said radiation path a second one of said standards in replacement of said first standard, said second count being representative of the thickness difference between said first and second standards; and means for calibrating the gauging means in response to the values of the output signal of said radiation detecting means while said first and second standards are in said radiation path respectively.

52. The system of claim 51, wherein said energizing means includes means for modifying said first count by said second count to produce a third count representative of the thickness of said second standard.

53. In a thickness measuring apparatus including gauging means having a source of radiation and radiation detecting means for receiving radiation transmitted along a radiation path from said source and producing an output signal functionally related to the level of radiation received by said radiation detecting means, said received radiation level being a function of the radiation absorption characteristics and thickness of material in said radiation path; and a standards magazine for selectively establishing in said path a plurality of radiation attenuating standards of predetermined thickness values; the calibration system comprising:

means for activating said standards magazine to establish a first standard in said radiation path in response to a representation of a prescribed thickness value;

means responsive to clock pulses for activating said standards magazine to establish in said radiation path a second standard having a thickness differing from that of said first standard by a predetermined factor and including:

first means for counting at a first rate the clock pulses up to a count representative of said prescribed thickness, second means for counting the clock pulses and delivering output pulses at a different second rate determined by said factor until said first counting means reaches said representative count;

third means for counting the output pulses of said second counting means from a starting count up to a count representative of a change in the prescribed thickness determined by the predetermined factor, said third means further being reversible as said first means begins counting beyond said representation count for counting the clock pulses from said change representative count back to said starting count; and fourth means responsive to said third means reaching said starting count for interrupting counting by said first counting means at a count which is representative of a thickness differing from said prescribed thickness by the predetermined factor; and means successively responsive to the values of said output signal when said first and second standards are in said radiation path for calibrating the apparatus.

54. A thickness measuring gauge comprising:

gauging means including a source of radiation and a radiation detector adapted to receive radiation transmitted along a radiation path from said source for producing a signal output functionally related to the level of radiation received, said received radiation having a magnitude which is a function of the radiation absorption characteristic and thickness of the material in said path;

means for modifying the operating level of said signal output;

means for modifying the rate of variation of said signal output;

means for selectively establishing radiation attenuating standards in said path of radiation in response to signals representative of respective selected standards thicknesses;

a first feedback circuit operable upon establishment said radiation path of a first one of said standards having a composite thickness representative of a selected thickness value corresponding to that of the material to be measured and including means responsive to a first difference between the value of said signal output and a first predetermined value for adjusting said operating level modifying means to drive said signal output toward said first predetermined value for said selected thickness value; and a second feedback circuit operable upon establishment of a second one of said standards in said radiation path after termination of said first feedback circuit operation, said second standard having a composite thickness differing from the coupling thickness of the first standard by an amount corresponding to a selected value of material thickness deviation, including means responsive to a second difference between the output of said rate of variation modifying means and a second predetermined value for adjusting said rate of variation modifying means to drive said output thereof toward said second predetermined value for said selected value of material thickness deviation.

55. The gauge of claim 54, comprising:

means for producing a first of said thickness representative signals for establishing said first standard in said path, said first feedback circuit being responsive to said first signal for beginning to operate;

means responsive to said output signal reaching said first predetermined value for terminating operation of said first feedback circuit; and means responsive to said output signal reaching said first predetermined value for producing a second of said thickness representative signals for establishing said second standard in said path, said second feedback circuit being responsive to said second signal for beginning to operate.

56. The gauge of claim 54, wherein said operating level modifying means includes means for adjusting the level of radiation emitted by said source.

57. The gauge of claim 54, wherein said rate of variation modifying means includes a variable gain amplifier responsive to said signal output.

58. A method for producing calibrated indications of thickness variations of a material in a path of radiation wherein the level of radiation emerging from the material varies as a function of the radiation absorption characteristic and thickness of such material, comprising the steps of:

producing first and second control signals corresponding to first and second thicknesses;

sequentially establishing in said radiation path first and second thickness standards corresponding to said first and second thicknesses in response to said first and second control signals respectively, to obtain respective first and second levels of emerging radiation;

irradiating a material in said path of radiation; and converting variations of the level of radiation emerging from the material into indications of thickness variations thereof calibrated with reference to said first and second thickness in response to said first and second levels of emerging radiation.

59. The method of claim 58, wherein said second thickness corresponds to a predetermined deviation from said first thickness.

60. The method of claim 59, wherein said predetermined deviation is a thickness value representing a predetermined percentage variation of said first thickness.

61. The method of claim 58, wherein the converting step comprises:
producing an output signal functionally related to the level of emerging radiation;
adjusting the value of the output signal produced in response to said first level of emerging radiation to a first predetermined value; and
modifying the rate of variation of said output signal to adjust the value of said output signal produced in response to said second level of emerging radiation to a second predetermined value,
whereby said output signal provides said calibrated indications of thickness variations.

62. A thickness measuring apparatus comprising:
gauge means for defining a path of radiation and for producing indications varying with thickness of a material in said path in response to the level of radiation emerging therefrom;
means respectively responsive to first and second signals corresponding to first and second reference thickness values for sequentially establishing first and second thickness standards corresponding to said first and second thickness values in said path, respectively; and
calibration means for calibrating said gauge means in response to the first and second levels of radiation emerging respectively when said first standard is in said path and when said second standard is in said path to reference the indications produced when a material of varying thickness is in said path to said first and second thickness values.

63. The apparatus of claim 62, wherein said calibration means comprises feedback means for adjusting the indications produced when one of said first and second standards is in said path.

64. The apparatus of claim 62, wherein said calibration means comprises first feedback means for adjusting the level of radiation emitted toward the material in said path in response to said first level of emerging radiation, and second feedback means for adjusting the rate of variation of the produced indications in response to said second level of emerging radiation.

65. The apparatus of claim 62, wherein said second thickness reference value corresponds to a predetermined deviation from said first thickness value, and comprising first means for producing said first signal corresponding to said first reference thickness value and second means responsive to said first signal for producing said second signal.

66. The apparatus of claim 62, comprising means for producing said first and second signals which include means for sequentially producing counts representative of the thickness of said first and second standards to activate said standard establishing means for establishing said first and second standrds in said path.

* * * * *